Sept. 11, 1956 R. H. DICKE 2,762,872
MICROWAVE AMPLIFIER EMPLOYING A MICROWAVE
RESONANT GAS AS THE AMPLIFYING ELEMENT
Filed Dec. 1, 1954 2 Sheets-Sheet 1

INVENTOR.
*Robert H. Dicke*
BY
*J. C. Whittaker*
ATTORNEY

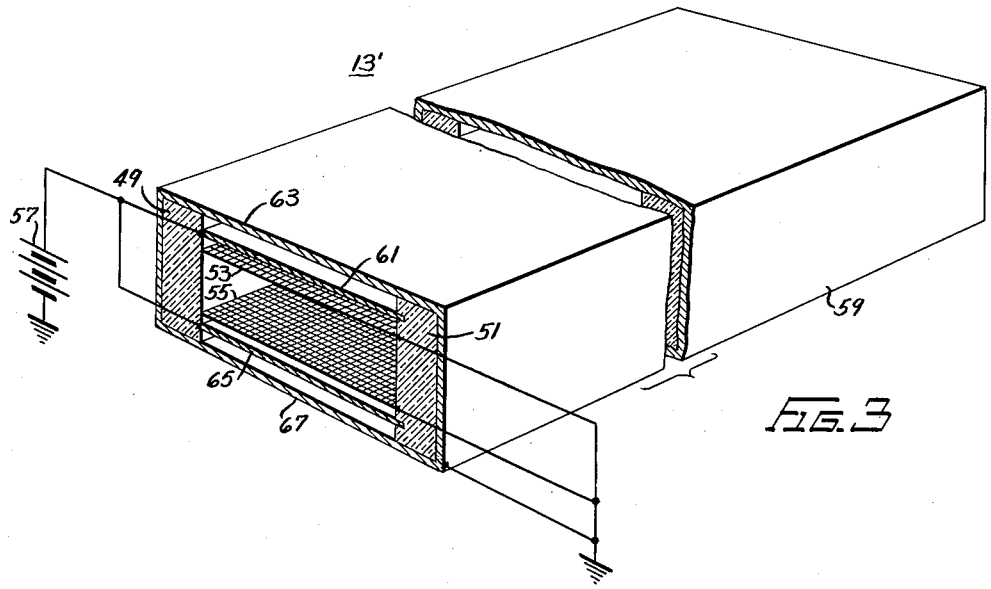
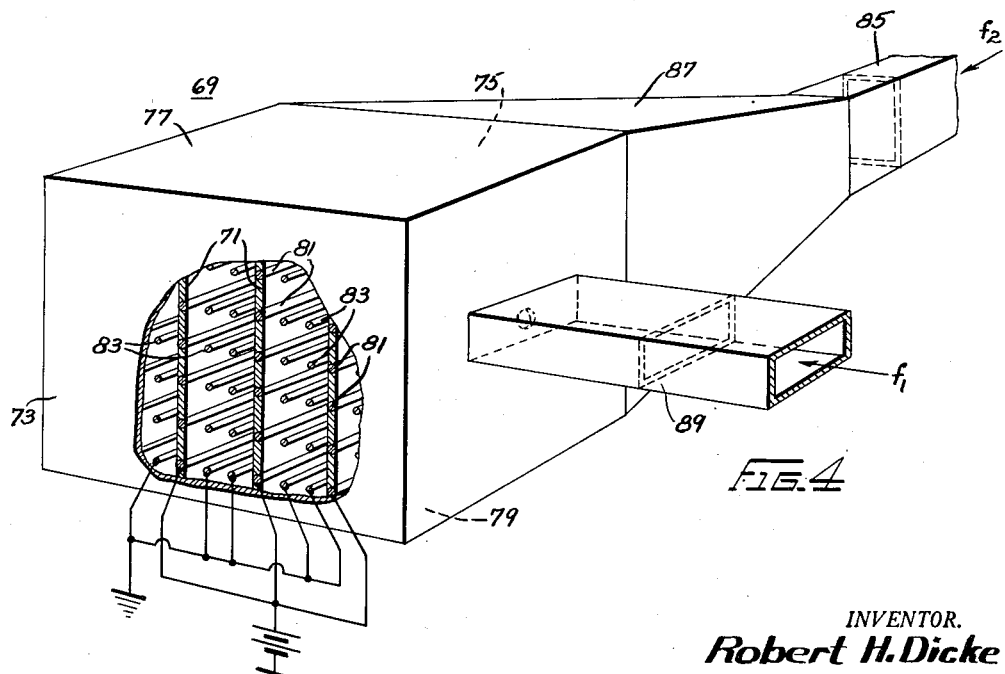

United States Patent Office 2,762,872
Patented Sept. 11, 1956

2,762,872

MICROWAVE AMPLIFIER EMPLOYING A MICROWAVE RESONANT GAS AS THE AMPLIFYING ELEMENT

Robert H. Dicke, Princeton, N. J.

Application December 1, 1954, Serial No. 472,353

10 Claims. (Cl. 179—171)

This invention relates generally to microwave amplifiers and particularly to an improved microwave amplifier which employs a microwave resonant gas as the amplifying element.

It may be shown that the particles of a substance, for example, the particles of a solid or liquid or the molecules of a confined body of microwave resonant gas may be caused to assume population distributions in various quantum energy states defining a positive temperature, such as room temperature (+300° Kelvin). With such a population distribution the lower energy particle states are populated more densely than the higher energy states, the particles are in a condition of thermal equilibrium, and microwave energy incident on the particles is absorbed. This is a condition for which the particles or gas molecules present "positive" attenuation to microwave energy incident thereon at a frequency at which the substance is resonant.

It further may be shown that either a microwave energy pulse, a Stark pulse, or a combination of continuous-wave microwave energy and a pulsed Stark field may be applied to the resonant substance to effect an inversion in the population distributions of the particle energy states. With the inversion effected fairly quickly the thermal equilibrium condition is disturbed and the energy states have population distributions defining a negative temperature (−300° Kelvin). With the population distributions inverted the particles or molecules emit rather than absorb microwave energy at a frequency at which the substance is resonant. Under this condition the particles or molecules may be said to present "negative" attenuation to microwave energy.

Provided the net attenuation of the resonant substance and the wave energy structure in which it is supported or confined is negative during the interval in which the substance is not in thermal equilibrium microwave energy incident on the resonant substance may be amplified. A collision broadened 3—3 ammonia gas spectral line has a line center absorption coefficient of $7.2 \times 10^{-4}$ cm.$^{-1}$. Absorption coefficients for other ammonia spectral lines are given by Gordy in "Reviews of Modern Physics," vol. 20, No. 4, page 692 (October 1948). After the state inversion the line center absorption coefficient of the 3—3 ammonia line is $-7.2 \times 10^{-4}$ cm.$^{-1}$. Since waveguide and cavity resonator components conveniently may be made which have absorption coefficients less than $7.2 \times 10^{-4}$ cm.$^{-1}$, the net absorption of the hollow wave energy structure and the gas contained therein is negative and input signals incident on the gas (or other resonant substance) are amplified rather than absorbed.

An object of the present invention is to provide an improved microwave amplifier.

Another object of the invention is to provide improved means for utilizing a microwave resonant gas not in thermal equilibrium for amplifying microwave energy.

Another object of the invention is to provide an improved microwave amplifier for use in or near the millimeter wave region.

A further object of the invention is to provide an improved and simplified microwave amplifier which continuously is active for amplifying input energy.

A still further object of the invention is to provide an improved microwave amplifier in which a microwave resonant gas is the amplifying element.

The foregoing and other objects and advantages are achieved in accordance with the invention in the following manner. A microwave resonant body of gas normally absorbing or presenting positive attenuation to microwave energy is confined in a hollow wave energy structure such as a sealed waveguide type cell or a gas-tight cavity resonator. When gas molecules collide with a partition or wall of the waveguide or resonator structure, the molecules are thrown into one of two definite energy states with the probability that the state into which the molecules are thrown is the lower of the two energy states in question.

A static perturbing field, an electric field, for example, is applied to gas molecules in the vicinity of the partition or wall structure. This static field tunes a particular microwave resonance of the gas molecules to a resonance frequency $f_2$, which is different from the normal frequency $f_1$ at which amplification of input energy is to occur. Continuous-wave microwave energy at a frequency $f_2$ is applied to the body of gas, the intensity of the C. W. field being adjusted so that as those gas molecules which have been thrown into a state of thermal equilibrium through impact with a wall move away from the wall and pass back through the perturbing field the molecules are excited from one energy state to the other resulting in an excess population in the higher of the two energy states for which they present negative attenuation to microwave energy at frequency $f_1$. The molecules impinging on the partition or wall thus are acted upon by the C. W. energy field and the static perturbing field and are excited into states such that they are available to amplify microwave input energy at frequency $f_1$.

The invention will be described in detail with reference to the accompanying drawing in which:

Figure 3 is a perspective view of a second type of waveguide cell for use in the system of Figure 1; and Figure 4 is another embodiment of the invention employing a two-mode type cavity resonator containing a microwave resonant gas.

Similar reference characters are applied to similar elements throughout the drawing.

Figure 1:
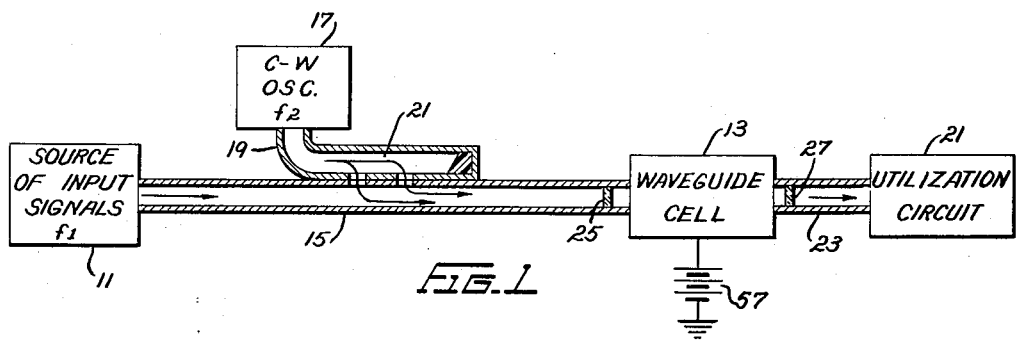
Figure 1 is a schematic diagram, partially in block form of system employing a microwave amplifier, according to the invention.

Referring to Figure 1, a source 11 of microwave signals which are to be amplified at frequency $f_1$ directly is coupled to the input end of a waveguide type cell 13 by means of a section of rectangular hollowpipe waveguide 15. The structure of the cell 13 will be described later with reference to Figures 2 and 3. A continuous-wave oscillator 17 which produces microwave energy at a resonance frequency of the gas $f_2$ is coupled to the cell 13 via another section of absorptively terminated rectangular waveguide 19, a directional coupler 21, preferably of the two-hole type, and waveguide section 15. The output end of the cell 13 is coupled to a utilization circuit 21 via a further waveguide section 23. The waveguide cell 13 is made gas-tight by a pair of microwave permeable windows 25 and 27 formed from materials such as quartz or mica. One of the windows 25 is positioned in the waveguide section 15 near the input end of the cell 13 and the other window 27 is positioned in waveguide section 25 near the output end of the cell 13.

The cell 13 contains a gas at low pressure capable of exhibiting molecular resonance. The gas normally presents positive attenuation to microwave energy and selectively absorbs microwave energy at frequencies at which the gas is resonant. Such gases are numerous and include, by way of example, ammonia, carbonyl sulfide, and the methyl halides. In the present instance it is assumed that the chosen microwave resonant gas is ammonia and that the gas pressure in the cell 13 is adjusted to be not greater than $10^{-2}$ millimeters of Hg and preferably is of the order of $10^{-4}$ millimeters of Hg. At such pressures the mean free path for collision between gas molecules is equal to or greater than the height of the waveguide cell 13.

Figure 2:
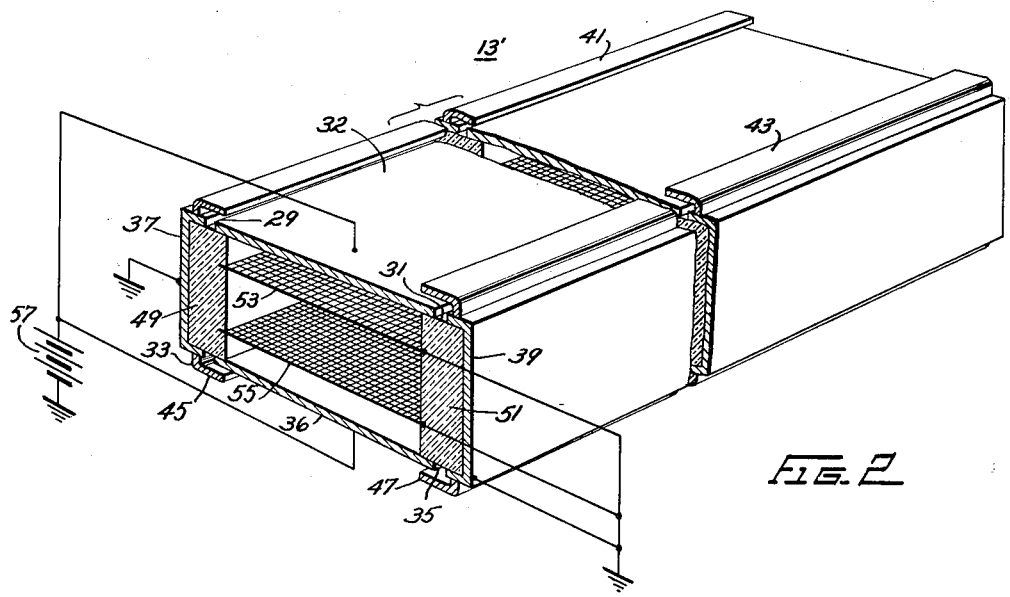
Figure 2 is a perspective view of one embodiment of a waveguide type cell for use in the system of Figure 1.

Figure 2 shows one embodiment of a waveguide type cell 13' which may be employed in the system of Figure 1. The cell 13' comprises a section of rectangular hollowpipe waveguide which, for K-band operation, may have inside dimensions of 1" x ¼". The hollowpipe waveguide includes a pair of slots 29 and 31 in the top broad wall 32 of the guide and a pair of slots 33 and 35 in the bottom broad wall 36 of the guide. The slots 29, 31, 33, and 35 are located near the side walls 37 and 39 of the guide thereby dividing the guide nito four sections each of which is insulated from the others for direct-current energy. Choke joints 41, 43, 45, and 47 are provided for electrically coupling the broad waveguide walls 32 and 36 and the narrow waveguide walls 37 and 39 at microwave frequencies.

The cell 13' includes a pair of dielectric slabs 49 and 51 each of which is in contact with one narrow side wall of the cell and extends along its longitudinal axis. The slabs 49 and 51 dielectrically load the cell 13' so that microwave energy is propagated therein at the free space velocity of light. The slabs 49 and 51 may be formed from any one of a number of dielectric materials such as polystyrene or polytetrafluoroethylene (the latter being sold commercially under the trade-name "Teflon"). For a dielectric constant of 2.5 the slabs 49 and 51 each may be about 0.16" thick. The cell 13' also includes a pair of Stark electrodes 53 and 55 which are mounted in the cell parallel to the broad waveguide walls 32 and 36 and are supported by the dielectric slabs 49 and 51. These electrodes 53 and 55 may comprise screens formed of 0.001" diameter tungsten wire with a 0.010" spacing between adjacent wires. The electrodes 53 and 55 extend along the longitudinal axis of the cell, one of the electrodes 53 being spaced from the top waveguide wall 32 a distance which is small compared to the height of the waveguide and the other electrode 55 being spaced a similar distance from the bottom waveguide wall 36. This spacing may be, for example, 0.040". The narrow side walls 37 and 39 of the waveguide and electrodes 53 and 55 are connected to some reference potential, preferably ground potential, and the broad waveguide walls 32 and 36 are connected to a direct-current source 57 of about +1000 volts.

The theory of operation of the apparatus described above is believed to be as follows. Consider the effect of the static electric (Stark) fields and the C. W. microwave energy field at frequency $f_2$ on a single moving gas molecule, the gas molecule initially being located between electrodes 53 and 55 and moving in the direction of the top waveguide wall 32. While the molecule is in the field-free space between electrodes 53 and 55 the molecule is tuned to frequency $f_1$ and is capable of amplifying microwave input energy at that frequency. On passing through the Stark field set up between electrode 53 and the adjacent top waveguide wall 32 the molecule is Stark shifted in frequency to frequency $f_2$. The molecule does not amplify energy at frequency $f_1$ while it is tuned to frequency $f_2$. The gas molecule then strikes the wall 32 and is thrown into one of two definite energy states with the probability being greater that the energy state into which the molecule is thrown is the lower of the two states in question. At this time the molecule is in a condition of thermal equilibrium. The Stark field between electrode 53 and waveguide wall 32 tunes the molecule back to the gas resonance frequency $f_2$ after its wall collision. The molecule then moves back through the Stark field toward the field-free space between electrodes 53 and 55. With the C. W. microwave field intensity adjusted to be sufficiently great, say 0.1 volt per centimeter or greater, as the molecule moves through the Stark field between wall 32 and electrode 53, the molecule is excited and is thrown from the lower into the higher energy state of the two energy states involved, or from the higher into the lower. The molecule is thereafter tuned to frequency $f_1$ after passing through the Stark electrode, and because of the now greater probability of being in the excited state emits rather than absorbs microwave energy, and is capable of amplifying input energy from the input signal source 11 at frequency $f_1$. The molecule is available for amplifying input energy for the time required for it to travel from electrode 53 to electrode 55. After the molecule passes through electrode 55 the Stark field between the electrode 55 and the bottom waveguide wall 36 tunes the molecule from frequency $f_1$ to frequency $f_2$. Amplification of input energy by this particular molecule then ceases. The molecule then strikes the waveguide wall 36, is thermalized and is re-tuned to frequency $f_2$ by the Stark field to which it is subjected. When the molecule moves back through the Stark field toward electrode 55 and passes therethrough the C. W. field at frequency $f_2$ again Stark shifts the tuning of the molecule to frequency $f_1$ and throws it preferentially into the higher of the two energy states. The molecule again is available to amplify input energy at frequency $f_1$.

Since a large number of molecules are present in the cell 13' many gas molecules always are present in the field-free space between electrodes 53 and 55'. Since the C. W. energy continuously acts on the gas molecules so that there are a greater number of these molecules in the higher energy state than in the lower energy state, the cell and body of gas continuously exhibit a net negative attenuation to microwave energy at frequency $f_1$ and continuously amplify input energy at that frequency.

Figure 3 shows another embodiment of a gas cell which may be employed in the system of Figure 1. In this instance the cell 13" comprises a one-piece rectangular waveguide section 59. The cell 13" again is loaded by dielectric slabs 49 and 51 which support the Stark electrodes 53 and 55. However, in this embodiment of the invention a thin imperforate metal electrode is supported by the dielectric slabs 49 and 51 between each Stark electrode 53 and 55. One of these thin electrodes 61 may be spaced about 0.020" from the top wall 63 of the waveguide 59 and the other thin electrode 65 may be spaced the same distance from the bottom waveguide wall 67. The thin electrodes 61 and 65 are maintained at +1000 volts by the D.-C. source 59 while the Stark electrode 53 and 55 and the waveguide 59 are at a reference potential which again preferably is ground potential.

The operation of the cell 13" in the system of Figure 1 is substantially as described with reference to the cell of Figure 2. The principal advantage of the instant structure, however, is that none of the exposed waveguide structure is at a high potential (+1000 volts), choke joints are not required, and the cell 13" is simple to fabricate.

In Figure 4 another embodiment of the invention is shown in which a two-mode cavity resonator rather than a waveguide cell continuously is active for purposes of amplification. In this instance the resonator 69 may be cubic in form, for example, ten centimeters on a side, and contains a microwave resonant gas at low pressure. The resonator 69 is divided into a number of chambers, for example, five, by a plurality of thin parallel dielectric sheets 71 such as polystyrene. The sheets 71 extend transversely from the resonator side wall 73 to an opposing side wall 75 and are normal to the top and bottom walls 77 and 79. Each dielectric sheet has embedded therein a plurality of horizontally aligned conductive wires, all of which are connected together to form grid 81. On opposite sides of each dielectric sheet 71 are electrically conductive grids 83. The grids 83 are spaced approximately 25 mils from the dielectric sheets 71. The grids embedded in the dielectric sheets 71 are maintained at a potential of about +300 volts with respect to the grids 83. A rectangular waveguide section 85 and a microwave horn 87 couples microwave energy into the resonator 69. The board walls of the waveguide 85 are arranged to be parallel to the dielectric sheets 71. A waveguide section 89, having its axis of symmetry 90° displaced with respect to the axis of symmetry of waveguide 85 is provided for coupling the microwave energy to be amplified at frequency $f_1$ into the resonator.

In operation microwave excitation energy from a continuous wave source (not shown) is transmitted through the side wall 75 excites the gas molecules at frequency $f_2$, a frequency slightly displaced from the frequency $f_1$ of the energy to be amplified. The gas molecules in the various chambers, by their random movement, strike the dielectric sheets of partitions 71 and become thermalized. After such thermalization the molecules move away from the partitions and just prior to passing through the grids 83 are Stark shifted in frequency from $f_2$ to $f_1$. After passage through the grids 83 the gas molecules are available to and amplify input energy at frequency $f_1$ untitl they pass into the grid plane next to an adjacent dielectric partition. Since the gas molecules in the various chambers continuously are in motion some of the molecules always are tuned to frequency $f_1$ and are available for amplifying microwave energy.

What is claimed is:

1. A microwave amplifier comprising, a hollow wave energy structure including at least one chamber containing a body of gas at low pressure capable of exhibiting molecular resonance, means for applying a static perturbing field to gas molecules of said body of gas in the vicinity of a wall of said chamber to tune molecules striking said wall to a resonance frequency of said gas, means for applying continuous-wave microwave energy at said resonance frequency to said body of gas whereby gas molecules which strike said wall are tuned to said resonance frequency and pass back through said perturbing field present negative attenuation to microwave energy at a frequency different from said resonance frequency, and means coupled to said hollow wave energy structure for applying microwave input energy at said different frequency to said body of gas and withdrawing amplified input energy from said body of gas.

2. A microwave amplifier comprising, a hollow wave energy structure including at least one chamber containing a body of gas at low pressure capable of exhibiting molecular resonance, means for applying static perturbing fields to gas molecules of said body of gas in the vicinity of opposed walls of said chamber to tune molecules striking said walls to a resonance frequency of said gas, means for applying continuous-wave microwave energy at said resonance frequency to said body of gas whereby gas molecules which strike said walls are tuned to said resonance frequency and pass back through said perturbing fields present negative attenuation to microwave energy at a frequency different from said resonance frequency, and means coupled to said hollow wave energy structure for applying microwave input energy at said different frequency to said body of gas and withdrawing amplified input energy from said body of gas.

3. A microwave amplifier comprising, a hollow wave energy structure including at least one chamber containing a body of gas at low pressure capable of exhibiting molecular resonance, means for applying static Stark fields to gas molecules of said body of gas in the vicinity of opposed walls of said chamber to tune molecules striking said walls to a resonance frequency of said gas, means for applying continuous-wave microwave energy at said resonance frequency to said body of gas whereby gas molecules which strike said walls are tuned to said resonance frequency and pass back through said Stark fields present negative attenuation to microwave energy at a frequency different from said resonance frequency, and means coupled to said hollow wave energy structure for applying microwave input energy at said different frequency to said body of gas and withdrawing amplified input energy from said body of gas.

4. A microwave amplifier as claimed in claim 2 wherein said hollow wave energy structure comprises a section of rectangular waveguide.

5. A microwave amplifier as claimed in claim 2 wherein said hollow wave energy structure comprises a cavity resonator resonant at said different frequency.

6. Microwave apparatus comprising, a section of rectangular waveguide having a pair of broad walls and a pair of narrow walls, a microwave resonant gas confined in said waveguide, a dielectric member in contact with each of said narrow walls extending along a longitudinal axis of said waveguide section so that energy propagated therein is propagated at the free space velocity of light, a pair of Stark electrodes supported by said dielectric members, said Stark electrodes being parallel to said broad walls with one Stark electrode spaced adjacent one of said broad walls and the other Stark electrode spaced adjacent the remaining broad wall, means for applying static electric fields to said Stark electrodes, means for applying continuous-wave microwave energy at a first frequency to said gas and microwave input energy at a second frequency to said gas, and means for withdrawing from said gas amplified microwave input energy at said second frequency.

7. Apparatus as claimed in claim 6, said broad walls being insulated from said narrow walls for direct-current energy, and including means for coupling said broad and narrow walls together at microwave frequencies.

8. Apparatus as claimed in claim 7, wherein said coupling means for microwave frequencies comprise a plurality of choke joints.

9. Apparatus as claimed in claim 6 including a pair of thin electrically conductive sheets supported by said dielectric members and extending along the axis of said waveguide section, said sheets each being parallel to said broad walls and located between one broad wall and its adjacent Stark electrode.

10. A cavity resonator having rectangular cross-section, a plurality of equally spaced microwave permeable dielectric members dividing said resonator into a plurality of separate gas-tight chambers each having rectangular cross-section, an electrically conductive screen embedded in each of said dielectric members, a pair of gas permeable electrically conductive screens positioned in each gas-tight chamber parallel to said dielectric members with each gas permeable screen adjacent a bounding wall of said chamber, means for introducing microwave energy into said resonator with its electric vector perpendicular to said dielectric member, and means for introducing microwave energy into said resonator with its electric vector parallel to said dielectric member.

References Cited in the file of this patent

UNITED STATES PATENTS

| | | |
|---|---|---|
| 2,591,258 | Hershberger | Apr. 1, 1952 |
| 2,695,361 | Norton | Nov. 23, 1954 |